Feb. 13, 1962  B. G. DAGGETT  3,020,784
SAW SET APPARATUS
Filed Dec. 1, 1958  2 Sheets-Sheet 2
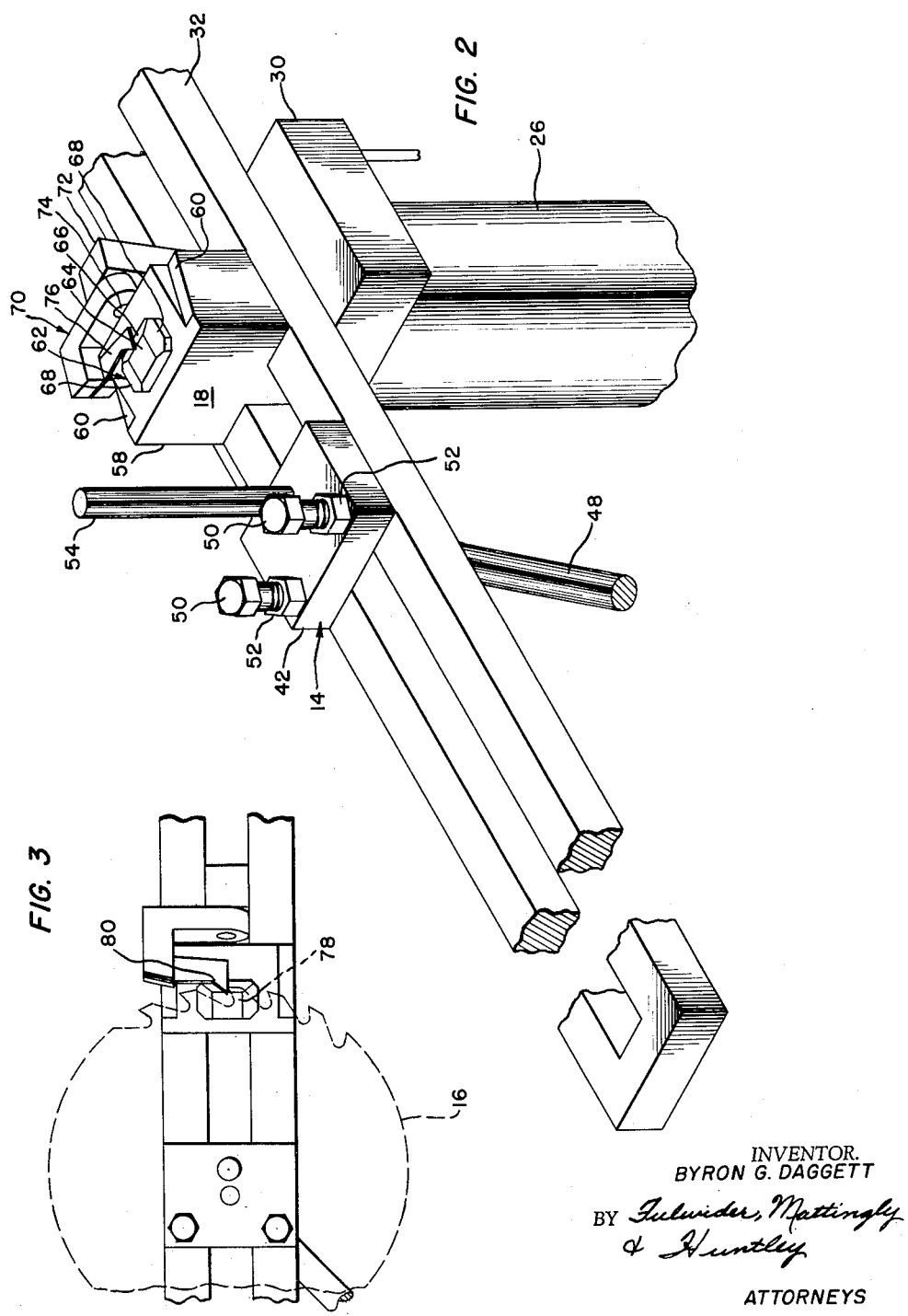
INVENTOR.
BYRON G. DAGGETT
BY *Fulwider, Mattingly*
*& Huntley*
ATTORNEYS

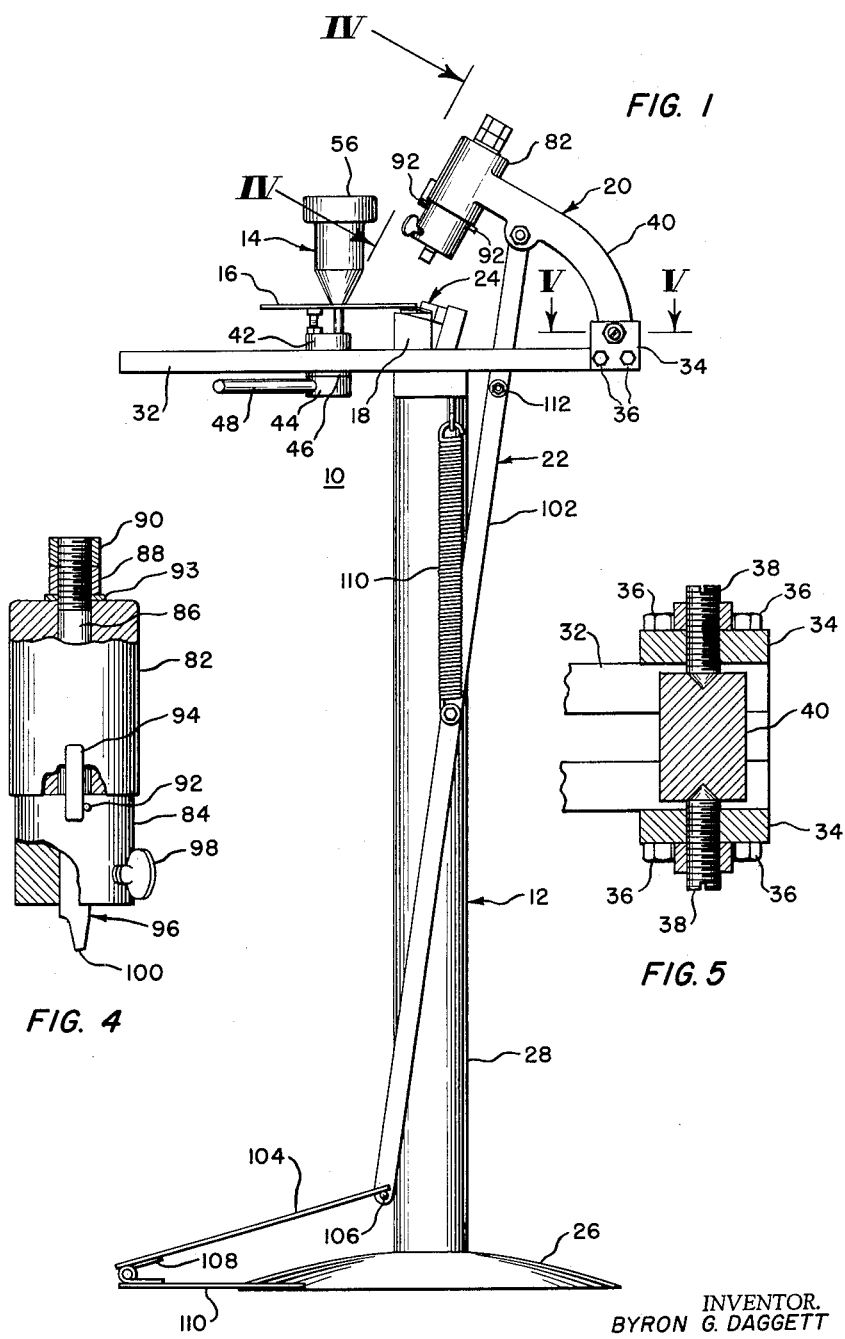

United States Patent Office 3,020,784
Patented Feb. 13, 1962

3,020,784
SAW SET APPARATUS
Byron G. Daggett, 3836 Centraloma Drive,
San Diego 7, Calif.
Filed Dec. 1, 1958, Ser. No. 777,345
2 Claims. (Cl. 76—63)

The present invention relates to saw set apparatus, and more particularly to saw set apparatus which is adapted to set each tooth of a saw in a substantially identical manner.

Heretofore, it has been the common practice to set the teeth of saws by crude setups which were ineffective to provide a satisfactory degree of uniformity of set. The accuracy of swaging or setting of the saw teeth is a matter of considerable skill under present practices, since quite often the method of setting the teeth amounts to no more than placing the saw in a stable position with the teeth thereof projecting over a hard surface, and striking the teeth with a hammer or some similar object to deform the teeth. The force with which the teeth are struck, and the direction of impact vary considerably from one workman to another and, indeed, it is extremely difficult for one workman to obtain a uniform set of all of the teeth of a single saw. Saws operating at high speed are characterized by undesirable vibration and poor cutting action when the set is improper, and a great deal of time and money is wasted because of the necessity for early replacement, resharpening, and resetting of such saws. Obtaining a proper set to a saw is made doubly difficult where the saw is a circular saw which must be spring set, that is, with alternate teeth bent in opposite directions, and with the set in two planes. More particularly, in this type of saw each tooth must be bent away from the plane of the body of the saw, and the point of each tooth must also be bent in a plane away from the plane of the remainder of the tooth. The semi-manual methods which are so widely used for obtaining such complex sets are largely inadequate to provide the desired precision, and machines which have been proposed to accomplish such precision setting are every expensive and intricate in operation.

Accordingly, the present invention provides a saw set apparatus which is adapted to simplify and expeditiously set each tooth of a saw in substantially uniform fashion. The apparatus is relatively inexpensive and easy to manufacture, and the cost of maintenance is low. The apparatus comprises a frame which has an anvil element mounted upon it, and a support means or platform for holding the saw to be set. The support means is slidable along the frame so as to bring the teeth of the saw in cooperative relationship with the anvil, and the support means may be locked to maintain this position. In addition, a deforming element is mounted upon the frame and is actuable toward and away from the anvil element. In one embodiment of the present invention, the deforming element takes the form of a heavy, hammer-like structure which is operated by a treadle mechanism. Upon depression of the treadle, the deforming hammer is brought into contact with a tooth of the saw disposed upon the anvil, and a sloping surface or facet of the anvil dictates the amount of set imparted to the saw tooth by the hammer element. In addition, the hammer element is adapted to include a sloping surface or facet which also bends the point of the tooth at an angle or plane sloping away from the remainder of the tooth. Thus, the single hammer structure is effective to produce a set of the tooth body proper, and also an additional set of the point of the tooth away from the body of the tooth proper. This facet of the hammer element may be rotated 180 degrees to impart this double set to the alternate teeth of the saw blade, the saw blade being turned over upon the support means for this purpose. An index element is carried upon the frame for properly locating each tooth in position for deformation between the anvil and the deforming element, and, like the rotatable facet of the hammer element, this indexing means may be rotated or pivoted through 180 degrees to properly locate the alternate teeth of a saw which is to be spring set. The anvil is provided with additional sloping faces or facets to permit clearance between the anvil and already swaged or set teeth on either side of the tooth which is to be set. Bias means are provided to return the element to its position of rest ready for another setting stroke or operation.

Although the description hereinafter made will be directed to a saw set apparatus in which the anvil is fixed and the deforming element movable, it will be apparent that this operation could possibly be reversed so that the anvil element moves and the deforming element is fixed. Therefore, it is to be noted that the present invention contemplates various means for effecting relative movement between a deforming element and an anvil element to accomplish the described swaging of the saw teeth.

Other objects and features of the present invention will be readily apparent to those skilled in the art from the following specification and appended drawings wherein is illustrated a preferred form of the invention, and in which:

FIGURE 1 is an elevational view of the saw set apparatus of the present invention;

FIGURE 2 is an enlarged detail perspective view of the anvil element, support means, and index member mounted in position upon the frame;

FIGURE 3 is a detail plan view on an enlarged scale, illustrating in particular the cooperative relationship between the index member and a tooth of a saw to be set;

FIGURE 4 is a view taken along line IV—IV of FIGURE 1, portions being sectioned for clarity; and FIGURE 5 is a view taken along line V—V of FIGURE 1.

Referring now to the drawings, and particularly FIGURES 1 and 2 thereof, there is illustrated a saw set apparatus 10 which comprises, generally, a frame 12 upon which is mounted a support means 14 for supporting a circular saw 16 in cooperative relationship with an anvil element 18 which is also mounted to frame 12. In addition, a deforming element 20 is pivotally mounted to frame 12 and is operable through manual actuation of a treadle mechanism 22. An index member 24 is provided for properly aligning or positioning a tooth of saw 16 directly between the anvil element 18 and the deforming element 20.

More particularly, frame 12 includes a heavy base 26 to provide stability for apparatus 10, and a vertically disposed shaft or post 28 which is welded at its lower end to base 26. The upper end of post 28 is welded to a block 30 which in turn is rigidly secured to a horizontally and longitudinally extending platform 32.

Platform 32 is slotted from its right end, as viewed in FIGURE 1, to a point just short of its left end, and a pair of side plates 34, FIGURE 5, are securely bolted to platform 32 by pairs of bolts 36. Plates 34 extend upwardly above the upper surface of platform 32 and are suitably apertured or bored to threadably receive a pair of threaded studs 38. These threaded studs 38 extend inwardly toward each other, and are each provided with a pointed inward end. These pointed ends are rotatably receivable in tapered openings provided in the lower end of an arm of element 20. As will be apparent, by applying a screw driver or the like to the outer ends of the pair of threaded studs, and rotating the studs in and out, element 20 may be precisely centered between the pair of side plates 34, and the frictional resistance between arm 40 and element 20 may be adjusted to permit element 20 to pivot freely without undue play.

Toward the opposite or left end of platform 32 is mounted the support means 14. Support means 14 includes an upper block which is slidable over the upper surface of platform 32 and which includes a threaded bore (not shown) extending through the lower surface of block 42 and approximately midway through block 42. A threaded stud (not shown) which is integral with a rotatable element 44 is receivable within this bore. A washer is provided between element 44 and the lower surface of platform 32, and handle 48 is rigidly secured to element 44 whereby handle 48 may be manipulated to rotate element 44 to lock or bind washer 46 and block 42 against the surface of platform 32. Thus, block 42 may be slidably adjusted to the desired position along the length of platform 32, and handle 48 may be rotated to locate block 42 in this adjusted position.

The block 42 of means 14 also includes a pair of bolts which are threadably receivable within threaded bores provided in the upper portion of platform 32, a pair of lock nuts 52 being provided to secure the pair of bolts 50 at any adjusted height. The saw 16 rests upon the upper ends of the pair of bolts 50, and an upright shaft 54 is adapted to pass through the central opening of the saw to center it in position. Thus, the saw is placed over shaft 54 with its left or rear portion resting upon the tops of the pair of bolts 50, and the position of block 42 is adjusted to bring the right or forward portion of the saw in position adjacent anvil element 18. The height of the pair of bolts 50 is adjusted so that the saw 16 is manipulated in a level or horizontal position.

A weight 56 is provided with a central bore which accepts shaft 54, weight 56 serving to maintain saw 16 in position. The lower end of weight 56 is tapered so as to accommodate saws having various sizes of central openings.

Anvil element 18, which is secured to frame 12 in any suitable fashion, comprises a base member 58 which is cut away at its rear edge and at its far edge to provide a pair of sloping shoulders 60. Anvil element 18 also includes a central anvil section 62 which is provided with a plurality of sloping faces or facets. Thus, there is provided a horizontal or flat face or facet 64 which is disposed in a plane substantially parallel to the plane of the saw 16. Section 62 also includes a forward facet 66 which forms a continuation of facet 64 and which slopes downwardly in a plane which intersects the plane of facet 64. A pair of side facets 68 are also provided in section 62, these facets 68 forming continuations of facet 64 and sloping downwardly or away from the plane in which the facet 64 lies.

An index member 70 is pivotally mounted to a bracket 72 which is rigidly secured to the right or forward side of element 18, member 70 being rotatable about a pin 74 which is carried by bracket 72. Member 70 is substantially L-shaped and is slotted through its lower leg to carry a thin plate member, plate member 76 being rigidly held in position by any suitable means, such as by a set screw or the like (not shown) disposed through member 70 into contact with facet 64. The length of plate member 76 is such that it precisely locates, FIGURE 3, a tooth 78 of saw 16 in position adjacent facet 66. The shoulders 60 provide clearance for the thicker lower leg of member 70 so that member 76 may be arranged in close adjacency with facet 64. A portion of member 76 is cut away at 80 to permit clearance with the teeth of saw 16 on either side of the tooth 78 which is to be set.

It is to be noted that the pivotable mounting of member 70 permits member 70 to function as an index for the positioning of all the teeth of a spring set saw. That is, in the position illustrated in FIGURE 3, member 70 may be used to locate alternate teeth for swaging or setting such teeth in one direction. Then, after saw 16 is turned over upon means 14, member 70 may be flipped or rotated so as to index the alternate teeth for setting them in a direction opposite to the previous setting. In this way apparatus 10 is quickly adapted for setting teeth in either direction.

Referring now to FIGURES 1 and 4, the element 20 which serves to impart the blow or force which swages or sets tooth 78 is made of heavy material so as to have a high inertia. Deforming element 20 comprises the arm 40 which is pivoted at its lower end to frame 12, and also comprises a centrally bored head portion 82 which is integral with arm 40. A holder 84 is provided with an integral central shaft 86 which is slidably disposed through the central bore of head portion 82, and which is maintained in position by a nut 88 and a lock nut 90 which, together with a washer 93, are disposed over the upper end of shaft 86. However, the adjustment of nuts 80 and 90 is such that holder 84 may be rotated with respect to head portion 82. Rotation of holder 84 is limited by a pair of pins 92 secured to holder 84. More specifically, holder 84 may be rotated through 180 degrees until one or the other of the pair of pins 92 comes into contact with a stop 94 which is secured to and projects from the body of head portion 82.

An impact setting, or forming element 96 is carried within an opening provided in the lower end of holder 84, a wing nut or thumb screw 98 serving to maintain element 96 in position within holder 84. The shank of element 96 is preferably square or provided with a flat face to prevent rotation thereof. It is noted that the lower end of element 96 is provided with a sloping face or facet 100, the lower edge of which is disposed in a plane which is substantially parallel to the plane of facet 66 when element 20 comes into adjacency with anvil element 18. However, in a transverse direction the plane of the surface of facet 100 is angled or sloped to intersect the first-mentioned plane of element 96. This orientation or configuration of facet 100 serves to bend the tip of tooth 78. In this manner the tooth 78 is swaged in a plane away from the plane of saw 16 and is also swaged at its point in a plane which slopes away from the plane of the swaged tip or outer periphery of tooth 78.

The rotatable nature of holder 84 permits a tooth 78 to be swaged in the manner described, and also permits the next adjacent tooth to be swaged in an opposite direction by rotating holder 84 through 180 degrees, and flipping over saw 16 upon means 14.

Element 20 is operated upwardly and downwardly by mechanism 22 which comprises a long link 102 which is pivotally secured at its upper end to the mid-portion of element 20, and pivotally associated at its lower end with a treadle 104. Treadle 104 is a flat upper member which carries a pin 105 at its free end, pin 105 being rotatably carried within an opening provided in the lower end of link 102. The inner end of treadle 104 is connected by spring hinge 108 to a base plate 110 which is welded to base 26. Thus, element 20 may be urged downwardly into contact with anvil element 18 by depressing treadle 104. Movement of treadle 104 downwardly is resisted by bias means or spring 110 which is connected between link 102 and frame 12 so that element 20 is always biased to its upward position. A stop 112 is carried by link 102, and projects therefrom to prevent travel of element 20 upwardly beyond a position established by contact of stop 112 with platform 32.

In operation, weight 56 is removed and a saw 16 is disposed over shaft 54, and adjustment of the pairs of nuts 52 and bolts 50 made to bring the plane of saw 16 into coincidence with facet 64 of anvil element 18. The weight 56 is then replaced, handle 48 is rotated to permit support means 14 to be moved along platform 32 until the teeth of saw 16 are in position over facet 66, as best illustrated in FIGURE 3. Saw 16 is then rotated until a tooth 78 to be formed is in abutment with the end of plate member 76 of index member 70. It is noted that at this time the pair of side facets 68 provide clearance for the teeth on either side of tooth 78. That is, these adjacent teeth may already have a slight set which would cause them to strike against anvil element 18 but for the clearance provided at the side facets 68.

Holder 84 of forming element 86 is then rotated to the position illustrated in FIGURES 1 and 4, and treadle 104 is depressed to bring deforming element 20 downwardly. Facet 100 of forming element 96 is thus caused to come into cooperative relationship with facet 66 of anvil element 18 to thereby deform tooth 78 downwardly away from the plane of saw 16, also deforming the extreme point of tooth 78 downwardly away from the plane of the main body of the deformed tooth 78. Release of treadle 104 then permits spring 110 to bring deforming element 20 to its upward position of rest, ready for another setting operation.

If saw 16 is of the spring set type, every other tooth is set in the fashion just described, and then, to set the undeformed teeth in the opposite direction, weight 56 is removed and saw 16 is turned over upon shaft 54, and weight 56 is then replaced. Index member 70 is then rotated through approximately 180 degrees so that plate member 76 bears upon the teeth of saw 16 from the opposite direction to that above described. In addition, holder 84 is also rotated through 180 degrees to bring facet 100 into a position opposite to that which it occupied in the above described forming or setting of the saw teeth.

Treadle 104 is again depressed and the teeth of saw 16 are set in very much the same way as above described, except that the point of the tooth is bent according to the new position of facet 100 of forming element 96. This operation is repeated until all of the previously undeformed alternate teeth are set.

It will thus be apparent that a saw set apparatus 10 has been provided which is adapted to expeditiously and quickly set each tooth of a saw in substantially uniform fashion. The apparatus is straightforward in design so that it is relatively inexpensive and easy to manufacture and the cost of maintenance is low. It substantially eliminates the necessity for individual skills, and places saw setting on more of a production basis.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:
1. Saw set apparatus comprising a frame; an anvil element mounted upon said frame, said anvil element having a first facet disposed in a first plane and a second facet forming a continuation of said first facet and disposed in a plane sloping away from said first plane; support means carried by said frame for supporting a saw, said support means being slidable along the longitudinal axis of said frame to bring a tooth of said saw into cooperative relationship with said second facet, said support means being adapted to adjust the height of said saw with respect to said first facet; an index element mounted adjacent to said anvil element and adapted to cooperate with said tooth to locate it in position along an axis substantially transverse to said longitudinal axis, said index element being pivotable through approximately 180 degrees to locate alternate teeth of a saw which must be spring set; and a set element carried by said frame and operable to impart a deforming force against said tooth.

2. Saw set apparatus comprising a frame; an anvil element mounted upon said frame, said anvil element including a first facet; a set means carried by said frame and including a rotatable set element, said set means also including stop means engageable with said set element for locating said set element in a pair of positions approximately 180 degrees apart, said set element having a second facet disposed at an angle to said first facet; support means carried by said frame for supporting a saw, said support means being slidable along the longitudinal axis of said frame to bring a tooth of said saw into cooperative relationship with said first facet; and an index element mounted adjacent to said anvil element and adapted to cooperate with said tooth to locate it in position over said first facet, said index element being pivotable through approximately 180 degrees to locate alternate teeth of a saw which must be spring set, said set element being rotatable from one of said positions to the other of said positions to correspond with the pivoted position of said index element.

References Cited in the file of this patent

UNITED STATES PATENTS

| 241,633 | Dunn | May 17, 1881 |
| 257,184 | Crouch | Aug. 4, 1891 |
| 554,721 | Packwood | Feb. 18, 1896 |
| 611,713 | Skersick | Oct. 4, 1898 |
| 675,236 | Newburg | May 28, 1901 |
| 726,246 | Birtels | Apr. 28, 1903 |
| 824,996 | Miller | July 3, 1906 |
| 1,152,256 | Worthington | Aug. 31, 1915 |
| 2,392,563 | Wilson | Jan. 8, 1946 |
| 2,808,744 | McColly | Oct. 8, 1957 |

FOREIGN PATENTS

| 263,346 | Switzerland | Nov. 16, 1949 |
| 852,639 | Germany | Oct. 16, 1952 |